United States Patent [19]

Roy et al.

[11] Patent Number: 4,878,340
[45] Date of Patent: Nov. 7, 1989

[54] TURF GROOMING REEL

[75] Inventors: Michael G. Roy, Mound; Helmut J. Ullrich, Eden Prairie, both of Minn.; John M. Beattle, Greeley; Jimmie D. Sinden, Evans, both of Colo.

[73] Assignee: The Toro Company, Minneapolis, Minn.

[21] Appl. No.: 149,772

[22] Filed: Jan. 29, 1988

[51] Int. Cl.⁴ .............................................. A01D 34/62
[52] U.S. Cl. ........................................ 56/249; 56/17.1
[58] Field of Search ..................... 56/7, 249, 17.1, 251

[56] References Cited

U.S. PATENT DOCUMENTS

| | | | |
|---|---|---|---|
| 1,538,381 | 5/1925 | Bull | 56/251 |
| 2,972,218 | 2/1961 | Benson | 56/249 |
| 3,205,643 | 9/1965 | Parkan | 56/249 |
| 3,453,814 | 7/1969 | Hanmer | 56/249 |
| 3,977,163 | 8/1976 | Olin et al. | 56/249 |
| 4,021,996 | 5/1977 | Bartlett et al. | 56/249 |

Primary Examiner—John Weiss
Attorney, Agent, or Firm—James W. Miller

[57] ABSTRACT

A grooming reel is carried on a greenmower between the front roller and the cutting reel. An improved adjustment unit is provided for changing the height of the grooming reel relative to the ground. The adjustment unit comprises an elongated rod connected to a support member on which the grooming reel is carried. A rotatable knob longitudinally draws the rod slightly along its axis to fine-tune the operating position of the grooming reel. In addition, the rod can be moved along its axis to raise and lower the grooming reel between an upper position and the operating position without disturbing the adjustment of the grooming reel in its operating position.

12 Claims, 3 Drawing Sheets

TURF GROOMING REEL

TECHNICAL FIELD

This invention relates generally to cutting units used on reel mowers and, more particularly, to a turf grooming reel for such a cutting unit.

BACKGROUND OF THE INVENTION

Greensmowers are well known in the turf care industry for cutting grass at the extremely low heights of cut required on golf greens. They come in different varieties, including a walk behind type that has just one cutting unit and a riding type that mounts multiple cutting units. The Greensmaster 3000 is a riding type greensmower that has three identical cutting units and is manufactured by The Toro Company, the assignee of this invention.

The cutting units on most greensmowers are generally the same and are known generically as reel mowers. Each cutting unit has a frame that mounts a rotatable cutting reel which sweeps the grass against a bedknife adjacent the reel to cut the grass. Front and rear rollers carried on the frame allow the cutting unit to roll over the ground. The cutting unit is propelled by the motion of the greensmover itself.

In recent years, turf grooming reels have appeared as accessories for the cutting units used on greensmowers. The grooming reels are placed on the cutting unit between the front roller and the cutting reel. They include a series of spaced, annular knife blades which normally are very close to the ground or even in slight engagement with the ground. The grooming reels are driven off the cutting reel to rotate the knife blades which then cut grass runners and remove thatch, thereby promoting better turf conditions on the golf green. U.S. Pat. No. 4,494,365 to Lloyd discloses a grooming reel of this type mounted on a typical greensmower cutting unit.

The front and rear rollers on the cutting units of most greensmower are vertically adjustable on the frame to raise or lower the height of cut. Threaded adjusting rods operated by rotatable knobs are often used to adjust the rollers. The device disclosed in the Lloyd patent uses threaded adjusting rods of this type to also raise or lower the grooming reel. This adjustment is needed to control how far the knife blades are spaced above or penetrate into the turf to suit the operator's preferences.

The grooming reel of Lloyd cannot be quickly or easily raised from its normal operating position adjacent the ground. It can, of course, be raised or lowered by rotating the threaded adjusting rods, but this is both tiring and time consuming if one wishes to raise it vey far or very frequently. In addition, once the grooming reel has been raised up out of the way, the desired operating position of the grooming reel relative to the ground has been lost. The only way to reestablish this setting is by trial and error readjustment of the threaded rods, which takes time and effort.

Several disadvantages arise because the Lloyd grooming reel cannot be raised or lowered without affecting the adjustment provided by the threaded rods. For example, the grooming reel is often not reset to a consistent operating position making the results of the grooming process unpredictable, i.e. too much thatch removed one time and not enough the next. In addition, Applicants have discovered that some operators pick an operating position for the grooming reel which is raised slightly above the ground and then leave the grooming reel in that position permanently, whether they want to groom the green or not. Even though the grooming reel can be shut off to not rotate, the tips of the knife blades are too close to the ground in this "permanent" position and on occasion can tear up or otherwise damage the green.

SUMMARY OF THE INVENTION

This invention provides an improved grooming reel for a mower having a frame and a cutting unit carried on the frame. The cutting unit comprises a cutting reel rotatable about a substantially horizontal axis and a bedknife cooperable with the cutting reel to sever ground growing vegetation. A rotatable grooming reel is carried on the frame and has a plurality of laterally spaced knife blades extending across at least a portion of the grooming reel.

The improved grooming reel comprises at least one adjustment unit for changing the vertical position of the grooming reel relative to the frame. The adjustment unit includes an elongated rod movably supported on the frame and connected to the grooming reel such that movement of the rod changes the vertical position of the grooming reel relative to the frame. A first selectively operable means carried on the rod is rotatable for moving the rod to effect a first adjustment in the vertical position of the grooming reel relative to the frame when the grooming reel is in an operating position closely adjacent the ground. Finally, a second selectively operable means is included for raising and lowering the grooming reel between its operating position and an upper position where the grooming reel is spaced above the ground without changing the first adjustment of the grooming reel in its operating position.

BRIEF DESCRIPTION OF THE DRAWINGS

This invention will be described in more detail hereafter in the Detailed Description, when taken in conjunction with the following drawings, in which like reference numerals refer to like elements throughout.

DETAILED DESCRIPTION

Figure 4:
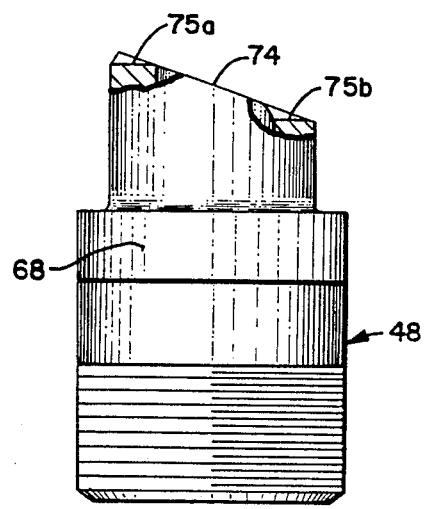
FIG. 4 is a side elevational view, partly in cross-section, of a portion of the adjustment unit shown in FIG. 2, particularly illustrating the inclined cam face thereof.
Figure 1:
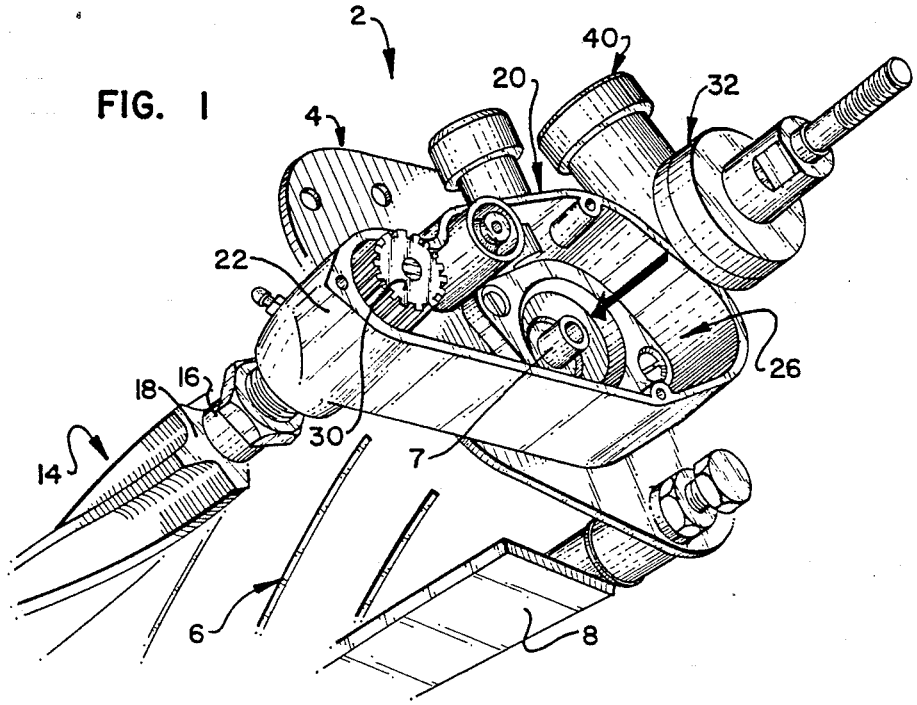
FIG. 1 is a perspective view of a greensmower having the improved turf grooming reel of this invention mounted thereon.
Figure 2:
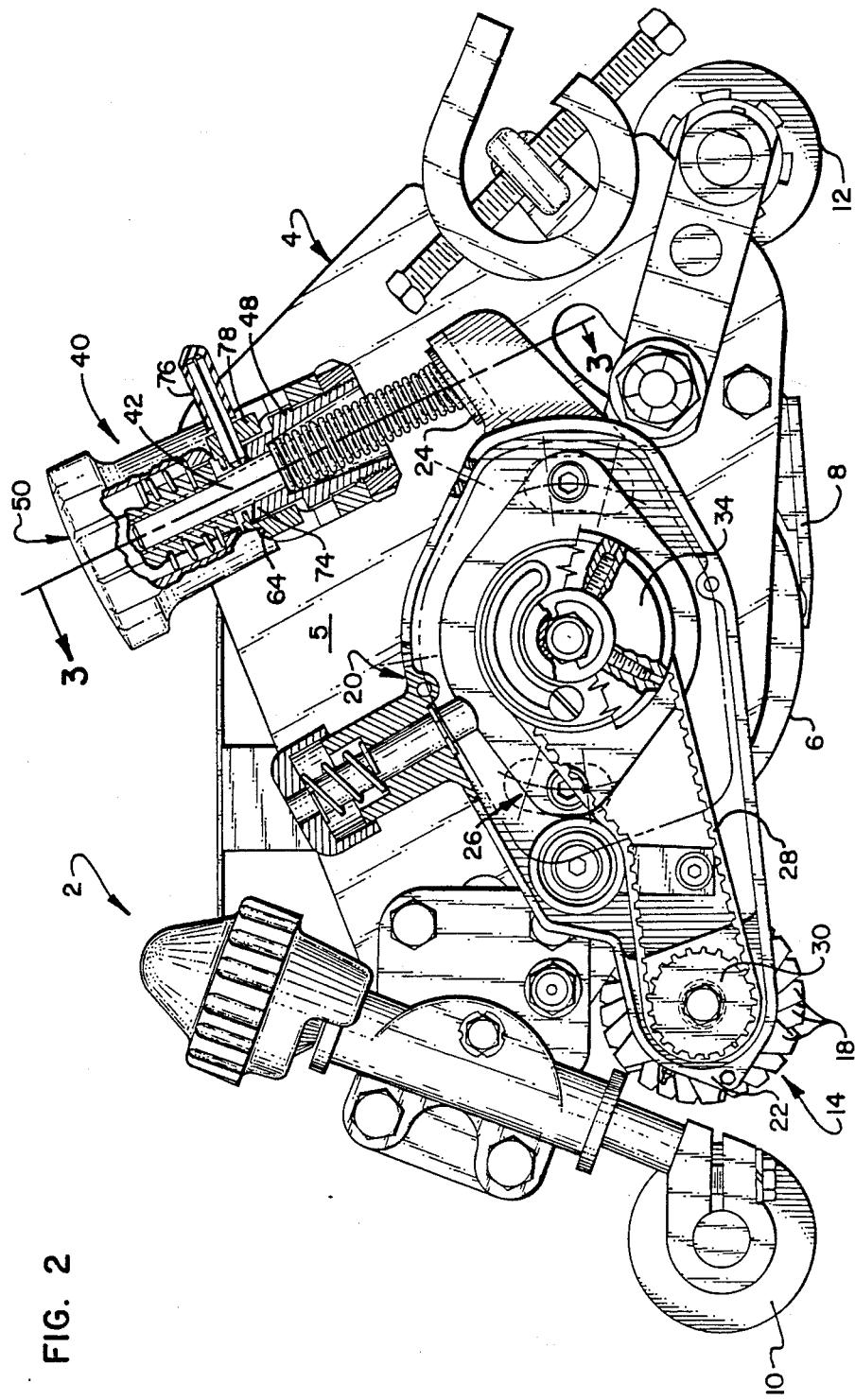
FIG. 2 is a side elevational view of the greensmower shown in FIG. 1, with some portions being broken away and shown in cross-section to more particularly illustrate one of the adjustment units for changing the vertical height of the grooming reel relative to the greensmower frame.

Referring first to FIGS. 1 and 2, a typical reel mower 2, of the type known as a greensmower, includes a frame 4 having spaced side plates 5. A rotatable cutting reel 6 and bedknife 8 are carried on frame 4 for cutting grass. Frame 4 is supported for movement over the ground by front and rear rollers 10 and 12 carried thereon. U.S. Pat. Nos. 3,680,293 to Klemenhagen and 4,494,365 to Lloyd disclose reel mowers with Lloyd specifically disclosing a greensmower. Both these patents are incorporated by reference to teach the details of such mowers.

This invention relates particularly to an improved turf grooming reel 14 carried on frame 4 between front roller 10 and cutting reel 6. Grooming reel 14 comprises a horizontal shaft 16 rotatably carried on frame 4. A plurality of turf grooming elements, comprising a set of annular, star-shaped blades 18, are carried side-by-side on shaft 16 across a substantial portion of its length. The Lloyd patent, previously incorporated herein by reference, teaches further details of the construction of such a grooming reel.

Grooming reel 14 is pivotally supported on frame 4 for moving vertically up and down relative to frame 4 by two support members 20 which function as bellcrank type levers. Each support member 20 is pivotally mounted to one of the frame side plates 5 for rotation about the shaft 7 of cutting reel 6. In addition, each support member is generally identical in shape and includes a forwardly extending arm 22 in which grooming reel 14 is rotatably journalled by bushings and a rearwardly extending arm 24. However, the support member 20 shown in FIGS. 1 and 2 is thicker than its counterpart on the other side of frame 4 to include a hollow, enclosed chamber 26 in which the drive components for grooming reel 14 are contained. The cover for chamber 26 is not shown in the drawings for the sake of clarity.

A drive belt 28 is contained inside chamber 26 for transferring rotation from cutting reel 6 to grooming reel 14. Drive belt 28 extends between a drive sprocket 30 secured to one end of grooming reel shaft 16 and a manually operable clutch 32 secured to one end of cutting reel shaft 7. An engagement knob 34 located outside chamber 26 is accessible to the operator and can be manually rotated to engage or disengage clutch 32. Clutch 32 is an axial pin type clutch of a conventional kind often used in certain presses. However, any suitable selectively operable clutch could be used for driving grooming reel 4 from cutting reel 6, including an electrical clutch operated by a suitable control button.

Grooming reel 14 can be raised or lowered relative to the ground by individually rotating each support member 20 relative to frame 4. An adjustment unit 40 on each side plate 5 is connected to one of the support members for individually rotating that support member. Since the adjustment units 40 are identical, only one will be described in detail.

Figure 3:
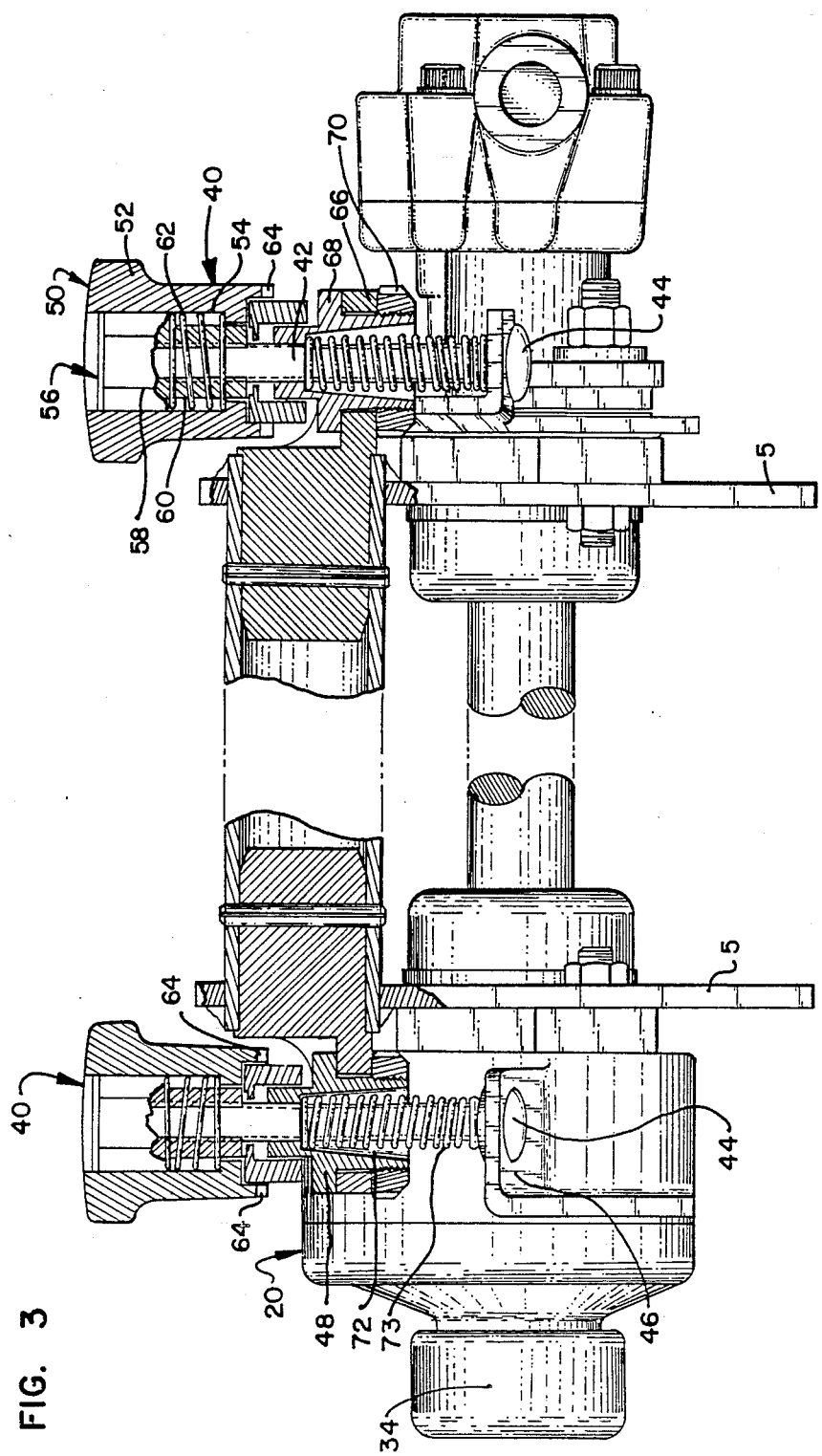
FIG. 3 is a partial cross-sectional view of the adjustment unit shown in FIG. 2, taken along lines 3—3 in FIG. 2.

Referring to FIGS. 2 and 3, each adjustment unit 40 includes an elongated, upwardly extending rod 42. The lower end of rod 42 has an enlarged head 44 which bears against the underside of a flange 46 on rearward arm 24 of support member 20. Rod 42 passes upwardly in a loose fit through a cylindrical member 48 which is fixed to side plate 5. A two-part knob assembly 50 is secured to the upper end of rod 42 above cylindrical member 48.

Knob assembly 50 includes an outer knob 52 having a central, hexagonally shaped bore 54 which is open at its upper end and closed at its lower end. A driver 56 received inside bore 52 includes a hexagonal head 58, which mates with hexagonal shape of bore 52, and a threaded downwardly extending stem 60 screwed onto the threaded upper end of rod 42. A biasing spring 62 extends between the head 58 of driver 56 and the closed lower end of bore 54 to bias knob 52 downwardly for a purpose to be described hereafter. The lower edge of knob 52 is scalloped to provide a plurality of semi-circular detents 64 spaced around the circumference thereof at equal intervals.

Cylindrical member 48 extends through an opening in a flange 66 welded or otherwise fixedly secured to frame 4 to extend outwardly from side plate 5. Cylindrical member 48 includes two outwardly extending shoulders 68 which rest on the top of flange 66. A nut 70 is threaded onto the outside of the lower end of cylindrical member 48 and may be tightened up against flange 66 to fix cylindrical member 48 thereon. The lower portion of cylindrical member 48 includes an internal passageway 72 in which the upper end of a compression spring 73 is received. Spring 73 surrounds rod 42 and extends between cylindrical member 48 and rearward arm 24 of support member 20 to bias the support member upwardly.

Cylindrical member 48 includes an upper face 74 that is vertically inclined relative to the axis of rod 42 to define a cam ramp. See FIG. 2. A cam follower comprises an outwardly extending handle or pin 76 which engages and follows the contour of face 74. Pin 76 is carried by a cap 78 on the top of cylindrical member 48 which cap also abuts against the bottom of knob assembly 50. Pin 76 is circular so that its upper half may be received in any one of the downwardly facing detents 64 in the lower edge of knob 52. In addition, cam face 74 also includes two upwardly facing, semi-circular detents or notches 75a and 75b located at both the top and bottom of cam face 74. The lower half of pin 76 can be received within one of the notches 75 to retain or lock pin 76 on cam face 74.

In operation of each adjustment unit 40, one must remember that a separate adjustment unit 40 is provided for each side of grooming reel 14 and each of these must be separately manipulated by the operator. However, the manner of operation of each is the same. Normally, grooming reel 14 has an operating position which is closely adjacent the ground. In this position, pin 76 is located at the top of cam face 74, pin 76 is received both in one of the detents 64 and also in the notch 75a at the top of cam face 74, and spring 73 has been compressed and is exerting a downward force on rearward arm 24 of support member 20, and hence an upward force on grooming reel 14.

Now, if the operator wishes to slightly adjust or "fine tune" the operating position of grooming reel 14 to move it slightly closer or further away from the ground, he first pulls upwardly on knob 52 until detent 64 clears pin 76. Then, he rotates knob 52 which rotates threaded driver 56 to longitudinally draw rod 42 upwardly or downwardly through the driver depending on the direction of knob rotation. After knob 52 has been rotated sufficiently far so that another detent 64 is aligned with the pin 76, knob 52 can then be released to allow spring 62 to reseat the knob in the pin. Because detents 64 are at equal, spaced intervals around the circumference of knob 52, they allow grooming reel 14 to be vertically adjusted in known increments merely by counting or feeling the number of detents which pass over pin 76 during knob rotation, e.g. movement between adjacent detents effects a change in the height of grooming reel 14 of preferably 0.007 inches.

While the rotation of knob 52 "fine-tunes" the operating position of grooming reel 14, it is sometimes desirable to quickly move reel 14 upwardly into an upper, non-use position (as shown in FIG. 2) spaced substantially above its operating position. This is done simply by rotating pin 76 approximately 180 degrees (while it is engaged in any detent 64) from its position at the top of inclined cam face 74, (where pin 76 is received in detent 75a) to the bottom of cam face 74 (where pin 76 seats in detent 75b). This drops the entire rod 42, along with its lower head 44, down by the height of the cam face 74. Compression spring 73 pushes downwardly on rearward arm 24 of support member 20 to keep flange 45 in contact with head 44, thereby pivoting support member 20 with the assistance of spring 73 in a direction which raises grooming reel 14. Reel 14 can be left in this upper position until the operator wishes to replace it in its operating position, which is accomplished by rotating pin 76 back up inclined cam face 74 until it reaches the top thereof and reseats in detent 75a.

One advantage of an adjustment unit 40 according to this invention is that grooming reel 14 can be quickly moved back and forth between its operating position and its upper position without disturbing the adjustment of the reel in its operating position. While the rotation of pin 76 from the top to the bottom cam face 74 also rotates knob 52 through 180°, this rotation is incidental to the major purpose of moving knob assembly 50 and rod 42 vertically downwardly by the height of cam face 74. In any event, this 180° rotation of knob 52 is precisely reversed when pin 76 is moved back up cam face 74 until it reaches detent 75a defining the operating position of grooming reel 14. Thus, the precise position of grooming reel 14 in its operating position is always recovered whenever the grooming reel is moved back downwardly into its operating position with no need to reestablish the setting through time consuming trial and error rotation of knob 52.

In addition, adjustment unit 40 also incorporates a biasing force, provided by compression spring 73, to help lift grooming reel 14 into its upper position. This is advantageous since reel 14 is quite heavy and frequent lifting thereof could be tiring. Moreover, the entire unit 14 is built with a minimum of parts, thereby keeping its cost and complexity to a minimum. For example, pin 76, which forms a part of the means for longitudinally moving rod 42, also cooperates with detents 64 to double as a latch for preventing unintentional rotation of knob 52 due to machine vibration or the like.

Various modifications of this invention will be apparent to those skilled in the art. For example, cylindrical member 48 has been disclosed herein as a separate piece which is fixedly attached to flange 66 by a nut 70. However, cam face 74 could be integrally molded into a boss on side plate 5 if so desired. In addition, while a large threaded knob 52 has been shown as the rotating means for acting on rod 42, other alternatives are available. Moreover, pin 76 need not extend outwardly from knob 52 as shown in the drawings as this is done merely to give the operator mechanical leverage in moving knob assembly 50 up and down cam face 74. If pin 76 were very short and did not extend outwardly past detent 64, then the operator would simply grab knob 52 and rotate the knob 180° to move the pin 76 from one detent 75 to the other. Accordingly, the scope of this invention is to be limited only by the appended claims.

What is claimed is:

1. An improved mower of the type having a frame supported for movement over the ground; a cutting unit carried on the frame comprising a cutting reel rotatable about a substantially horizontal axis and a bedknife cooperable with the cutting reel to sever ground growing vegetation; a rotatable grooming reel carried on the frame having a plurality of laterally spaced knife blades extending across at least a portion of the grooming reel; wherein the improvement relates to the grooming reel and comprises:
   (a) at least one bellcrank support member pivotally carried on the frame having forward and rearward arms, wherein the grooming reel is rotatably journalled on the forward arm of the support member; and
   (b) at least one adjustment unit for changing the vertical position of the grooming reel relative to the frame, wherein the adjustment unit comprises:
      (i) an elongated rod movably supported on the frame, wherein the rod is attached to the rearward arm of the support member and extends upwardly away from the rearward arm such that movement of the rod pivots the support member on the frame to change the vertical position of the grooming reel relative to the frame;
      (ii) a first selectively operable and rotatable means carried on the rod for moving the rod to effect a first adjustment in the vertical position of the grooming reel relative to the frame when the grooming reel is in an operating position closely adjacent the ground;
      (iii) a second selectively operable means for raising and lowering the grooming reel between its operating position and an upper position where the grooming reel is spaced above the ground without changing the first adjustment of the grooming reel in its operating position; and
      (iv) means for biasing the grooming reel upwardly from its operating position towards its upper position to help raise the grooming reel, wherein the biasing means comprises a compression spring surrounding the rod which extends between the rearward arm and a fixed abutment on the frame to be compressed when the grooming reel is in its operating position.

2. An improved mower as recited in claim 1, wherein the first selectively operable means comprises a knob assembly threadedly attached to the rod.

3. An improved mower as recited in claim 2, wherein the second selectively operable means comprises:
   (a) a fixed cam track on the frame extending vertically relative to the frame; and
   (b) a cam follower in engagement with the cam track for moving the rod relative to the frame as the follower moves on the cam track.

4. An improved mower of the type having a frame supported for movement over the ground; a rotatable cutting reel and bedknife carried on the frame for cutting vegetation; and a rotatable grooming reel carried on the frame; wherein the improvement relates to the grooming reel and comprises:
   at least one adjustment unit for changing the position of the grooming reel relative to the frame, wherein the adjustment unit comprises:
   (a) an elongated rod having an axis and a threaded portion, wherein the rod is movably carried on the frame and is connected to the grooming reel such that movement of the rod changes the position of the grooming reel relative to the frame;
   (b) a threaded knob assembly rotatably carried on the threaded portion of the rod, wherein the knob assembly has means for drawing the rod through the knob assembly as the knob assembly is rotated, thereby moving the rod relative to the frame to effect a first adjustment in the position of the grooming reel relative to the frame; and (c) means for moving the knob assembly relative to the frame in the direction of the axis of the rod to effect a second adjustment in the position of the grooming reel relative to the frame, wherein the moving means comprises:
   (i) a cam ramp that is inclined relative to the axis of the rod; and
   (ii) a selectively operable cam follower interposed between the cam ramp and the knob assembly and abutting against the knob assembly, whereby movement of the cam follower on the cam ramp acts on the knob assembly to move the knob assembly thereby moving the rod to effect the second adjustment.

5. An improved mower as recited in claim 4, further including detent means cooperable between the knob assembly and the cam follower to prevent unintended rotation of the knob assembly.

6. An improved mower as recited in claim 4, further including:
   (a) an abutment member fixed to the frame of the mower with the rod passing through the abutment member, wherein one end of the abutment member comprises a generally circular face that is inclined relative to the direction of the rod to define the cam ramp; and
   (b) wherein the cam follower comprises:
      (i) a generally circular cap rotatably carried on the face of the abutment member; and
      (ii) a pin carried on the cap which pin is in engagement with the face of the abutment member.

7. An improved mower as recited in claim 6, wherein the pin is sufficiently long to extend radially out from the cap, thereby serving as a handle to allow the cap to be more easily rotated.

8. An improved mower as recited in claim 6, further including detent means cooperable between the knob assembly and the pin to prevent unintended rotation of the knob assembly.

9. An improved mower as recited in claim 8, wherein the knob assembly comprises:
   (a) an inner driver received on the threaded portion of the rod;
   (b) an outer knob non-rotatably carried on the inner driver such that rotation of the outer knob rotates the inner driver to pull the rod through the driver, wherein the knob is axially movable relative to the driver; and
   (c) means for biasing the outer knob relative to the driver to a first position in which the detent means is engaged, and wherein the outer knob is movable against the bias of the biasing means to a second position in which the detent means is disengaged.

10. An improved mower as recited in claim 9, wherein the outer knob has one edge generally adjacent the cap, and wherein the detent means comprises a plurality of recesses located on the cap edge which recesses are shaped to receive the pin therein.

11. An improved mower to the type having a frame supported for movement over the ground; a rotatable cutting reel and bedknife carried on the frame for cutting vegetation; and a rotatable grooming reel carried on the frame; wherein the improvement relates to the grooming reel and comprises:
   at least one adjustment unit for changing the position of the grooming reel relative to the frame, wherein the adjustment unit comprises:
   an elongated rod having the axis and a threaded portion wherein the rod is movably carried on the frame and is connected to the grooming reel such that movement of the rod changes the position of the grooming reel relative to the frame;
   (b) a threaded knob assembly carried on the threaded portion of the rod, wherein the knob assembly has means for drawing the rod through the knob assembly as the knob assembly is rotated, thereby moving the rod relative to the frame to effect an adjustment in the position of the grooming reel relative to the frame, wherein the knob assembly comprises:
      (i) an inner driver received on the threaded portion of the rod;
      (ii) an outer knob non-rotatably carried on the inner driver such that rotation of the outer knob rotates the inner driver to pull the rod through the driver, wherein the knob is axially movable relative to the driver between first and second positions; and
      (iii) means for biasing the outer knob relative to the driver into its first position, wherein the outer knob is movable against the bias of the biasing means to move from its first to its second position; and
   (c) detent means for preventing the outer knob from rotating which detent means is engaged in the first position of the outer knob on the driver and is disengaged in the second position thereof.

12. An improved grooming reel carried on the frame of a mower by at least one support member, wherein the improvement relates to at least one adjustment unit for changing the height of the grooming reel relative to the ground, which comprises:
   (a) an elongated rod having an axis which rod is movably carried on the frame and is connected to the support member on which the grooming reel is carried;
   (b) a rotatable knob assembly carried on the rod, wherein the knob assembly has means for drawing the rod through the knob assembly as the knob assembly is rotated to adjust the grooming reel relative to the ground when the grooming reel is in an operating position closely adjacent the ground; and
   (c) selectively operable means on the rod for moving the rod along its axis relative to the frame to raise and lower the grooming reel between an upper inoperative position and its operating position without changing the adjustment provided by the knob assembly in the operating position of the grooming reel.

* * * * *